Aug. 3, 1937. H. FORD ET AL 2,088,782

TRANSMISSION

Filed Sept. 28, 1935 2 Sheets-Sheet 2

INVENTORS.
Henry Ford.
A. O. Roberts.
H. W. Simpson.

BY

ATTORNEY.

W.
Edwin C. McRae.

Patented Aug. 3, 1937

2,088,782

UNITED STATES PATENT OFFICE 2,088,782

TRANSMISSION

Henry Ford, Albert O. Roberts, and Howard W. Simpson, Dearborn, Mich., assignors to Ford Motor Company, Dearborn, Mich., a corporation of Delaware Application September 28, 1935, Serial No. 42,556

8 Claims. (Cl. 74—272)

The object of our invention is to provide a transmission which is especially suitable for use in connection with automotive vehicles.

More specifically, the object of our invention is to provide a transmission which is controlled by a valve and which valve is adapted to be actuated by the driver of the vehicle. Our improved transmission is of the servo operated type wherein the valve is moved to any one of its several positions at which time fluid under pressure effects the change of speed ratios. Our transmission employs a combination of planetary and epicyclic gearing wherein a pair of brake drums are provided, which when held from rotation effect the low and reverse speed gear ratios in the transmission. A novel direct drive effecting clutch is provided by means of which the several planetary units are clamped together to effect the high speed drive. While servo operated planetary transmissions are conceded to be old, still it is believed that the transmission shown herein has many novel and patentable features. For example, in the direct drive clutch the main ring gear is used as a piston which clamps the several parts together. This double use simplifies the construction and makes the device more responsive in operation.

A further unique feature of our transmission is that the gearing therein is exceptionally quiet, due in part to the relatively low tooth speed of the gears and in part to the arrangement whereby the tooth pressures on the higher speed pinions are applied at opposite sides of the pinions to thereby reduce the bearing pressures and maintain the pitch lines tangent. This feature, while inherent in planetary gearing, is believed unique in epicyclic gearing and contributes materially to the quiet operation of this device.

It is not known whether or not the exact gearing employed herein is new although it is believed that the applicants were the first to employ the arrangement shown.

Likewise, the arrangement of the control valve and brake band operating pistons is believed to be new. Further, the means for guiding the pistons on the cylinder heads lessens the overall dimensions of the transmission without a reduction in efficiency and is believed to be new.

A further feature of considerable importance is the unique method of oiling the gearing when the low and reverse speed ratios are engaged. This is accomplished by the same oil pump which supplies oil under pressure for the servo operated clutches.

With these and other objects in view our invention consists in the arrangement, construction and combination of the various parts of our improved device, as described in the specification, claimed in our claims and illustrated in the accompanying drawings, in which:

Figure 3 is a sectional view, taken on the line 3—3 of Figure 1.

Figure 4 is a diagrammatic view, illustrating the positions of the control valve for effecting the several speeds of the transmission.

Figure 1:
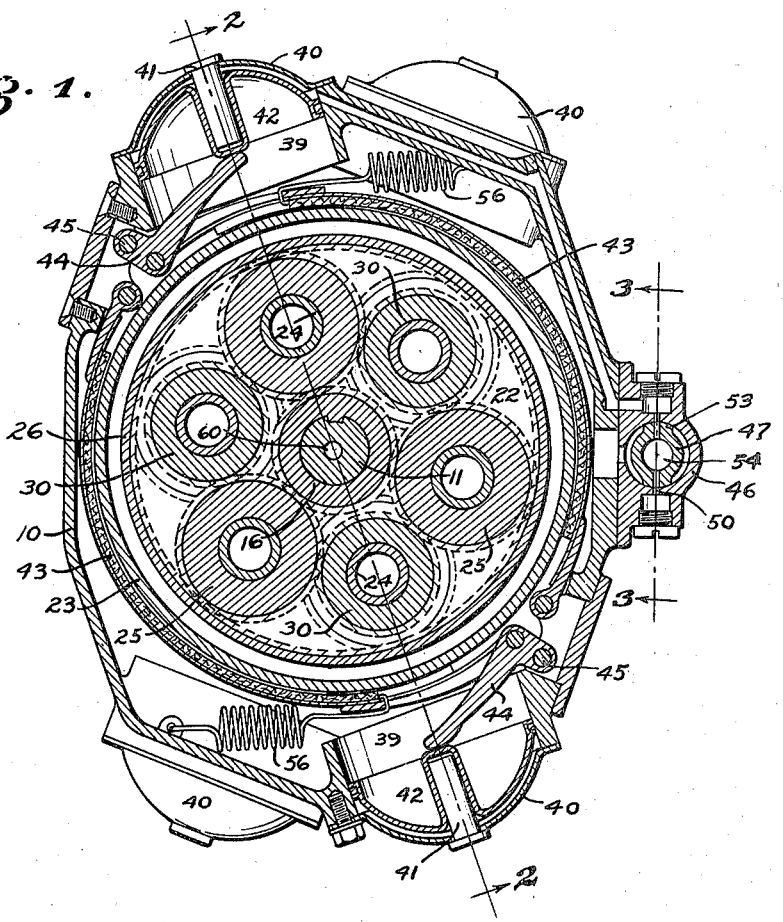
Figure 1 is a transverse sectional view, taken through the reverse speed effecting band of the transmission.

The transmission shown is adapted to be used in a vehicle wherein the engine and transmission are disposed at the rear of the car. The drive shaft extends from the engine through the transmission, the torque being conducted back through a sleeve which is rotatably mounted around the drive shaft. This particular arrangement is not essential as the drive shaft may enter at one side of the transmission with the driven shaft emerging from the other side, as required in the conventional motor installation.

Referring to the accompanying drawings, 10 indicates a housing having a drive shaft 11 rotatably mounted therein upon a plate 12 which forms a closure for one end of the transmission. The other end of the drive shaft 11 extends through a driven sleeve 13, this sleeve being rotatably mounted in the housing upon a pair of bearing units 14. A herringbone pinion 15 is formed integrally with the sleeve 13, which pinion meshes with a suitable herringbone axle gear to thereby convey the drive to the wheels of the vehicle. Our transmission selectively connects the drive shaft 11 with the sleeve 13 through either a 3.36 to 1 reverse speed ratio, a 2.17 to 1 low speed ratio or a direct high speed.

Figure 2:
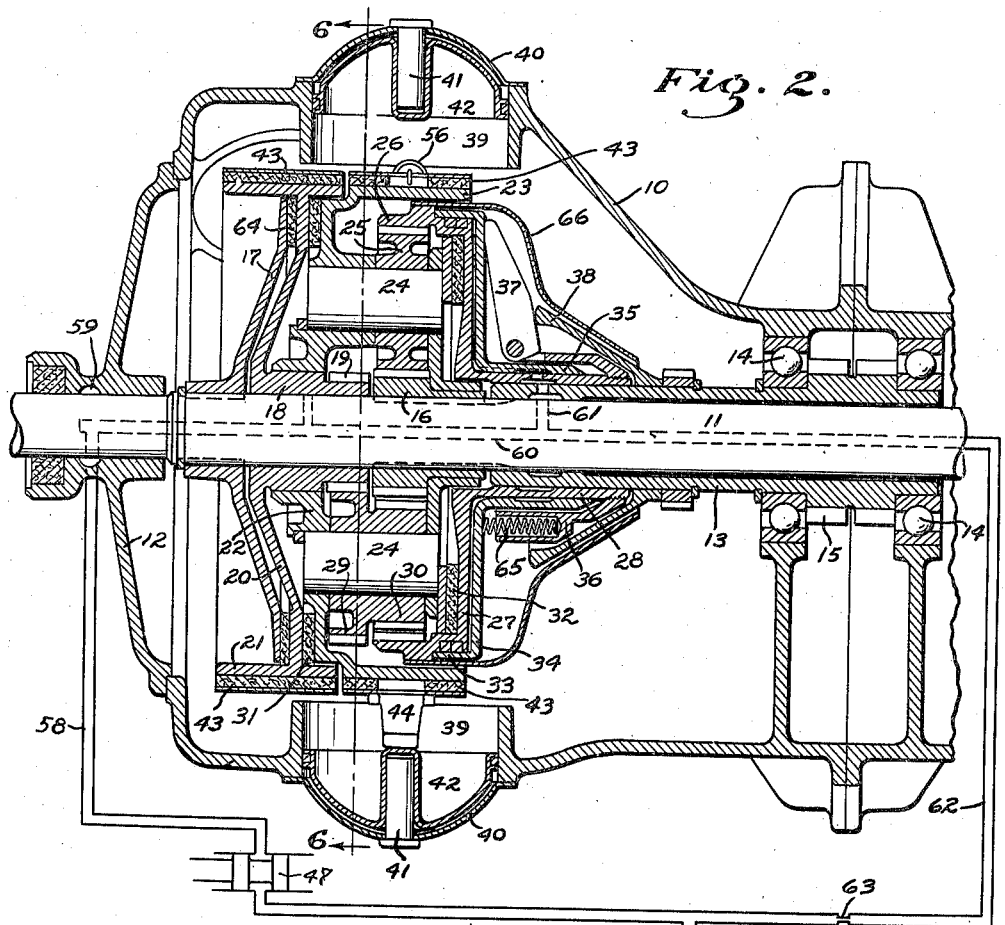
Figure 2 is a sectional view, taken on the line 2—2 of Figure 1.

Referring to the drawings, a 33 tooth driving sun gear 16 is splined to the intermediate part of the shaft 11 while a disc 17 is splined to the outer or left hand end of the shaft 11 in position spaced from the gear 16. A low speed brake drum sleeve 18 is rotatably mounted upon the shaft 11 between the gear 16 and disc 17, the sleeve 18 having a 30 tooth low speed sun gear 19 formed integrally thereon in position adjacent to the gear 16. A web 20 extends from the outer end of the sleeve 18 which terminates in a brake drum 21, which brake drum when held from rotation also holds the gear 19 from rotation. From Figure 2 it will be seen that one end of a planet carrier 22 is rotatably mounted upon the intermediate portion of the sleeve 18, while a reverse speed brake drum 23 is formed integrally with the periphery of this carrier. The planet carrier 22 is provided with six pins 24 which are evenly spaced around its axis, each of which extends parallel to the shaft 11 within the drum 23. The other end of the planet carrier 22 is rotatably mounted upon the hub of the sun gear 16.

Each alternate pin 24 has a 39 tooth reverse speed planet gear 25 rotatably mounted thereon, these gears being in mesh with both the driving gear 16 and with a 111 tooth internal ring gear 26. The ring gear 26 is formed integrally with a piston 27, which piston is provided with a sleeve-like hub portion 28, this sleeve being slidably but non-rotatably mounted upon the adjacent end of the sleeve 13. Thus, a gear train is established through the sun gear 16, planet gears 25 and ring gear 26. Each of the three remaining pins 24 has a cluster gear unit rotatably mounted thereon, these cluster gears each being composed of a 42 tooth gear 29 which is in mesh with the low speed sun gear 19, which gear 29 is formed integrally with a 33 tooth gear 30. The gears 30 are aligned with the sun gear 16 and ring gear 26 but do not mesh with either of these gears. The gears 30 do mesh with each of the adjacent reverse gears 25 to thereby establish a gear train from the low speed sun gear 19 through the gears 29, 30 and 25 to the sun gear 16 and ring gear 26.

From the foregoing, it will be seen that upon rotation of the drive shaft 11, the planet carrier 22 being held stationary, a drive is obtained from the sun gear 16 through the planet gears 25 to the ring gear 26, to thereby drive the ring gear 26 at a reduced speed in a reverse direction. The following gear speeds result:

|  | R. P. M. |
|---|---|
| Driving sun gear 16 | 1000 |
| Planet carrier 22 | 0 |
| Low speed sun gear 19 | Neg. 1400 |
| Cluster gears | 1000 |
| Reverse planet gear 25 | Neg. 845 |
| Internal gear 26 | Neg. 297 |

When neither the planet carrier nor the low speed gear 19 is held from rotation, the transmission assumes a neutral position in which the low speed gear 19 revolves backwards sufficiently to permit the planet carrier movement in a forward direction at a speed wherein the ring gear 26 is stationary. When the transmission is in neutral the following gear speeds result:

|  | R. P. M. |
|---|---|
| Driving sun gear 16 | 1000 |
| Planet carrier 22 | 230 |
| Low speed sun gear 19 | Neg. 850 |
| Cluster gears | 770 |
| Reverse planet gear 25 | Neg. 650 |
| Internal gear 26 | 0 |

It will thus be seen that in neutral the speed of the several gear elements in the transmission are each lower than the speed of the driving gear.

Figure 5:
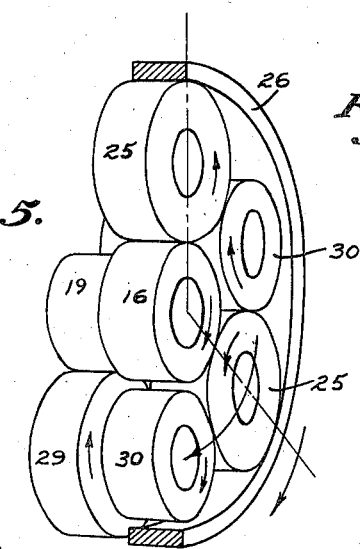
Figure 5 is a diagrammatic view, illustrating the working of the compound epicyclic gear train employed.
Figure 6:
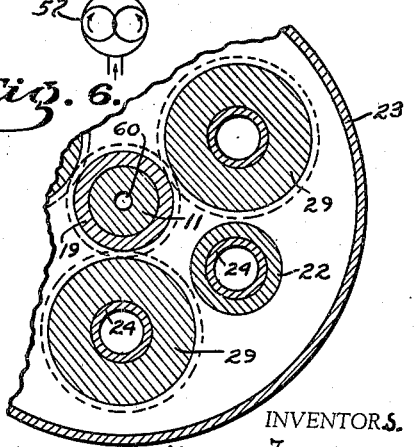
Figure 6 is a sectional view, taken on the line 6—6 of Figure 2.

The low speed forward drive is effected by holding the low speed sun gear 19 stationary while driving the sun gear 16. The direction of rotation of the various gears for this speed is shown in Figure 5 from which it will be seen that the planet carrier is rotated in a forward direction faster than required in neutral by reason of the cluster gears and gears 19 and 25. The gears 25 rotate counterclockwise upon their own axes thereby rotating the gears 30 which, through the gears 29, cause the planet carrier to revolve forwardly around the stationary gear 19. This forward movement of the carrier is at 583 R. P. M., while its movement in neutral is only at 230 R. P. M. Thus, the internal gear 26 is rotated forwardly at 460 R. P. M. The speeds of various gears when this ratio is in effect is as follows:

|  | R. P. M. |
|---|---|
| Driving sun gear 16 | 1000 |
| Planet carrier | 583 |
| Low speed sun gear 19 | 0 |
| Cluster gears | 416 |
| Reverse planet gear 25 | Neg. 353 |
| Internal gear 26 | 460 |

From the foregoing it will be seen that also in this low speed ratio the various gear speeds are considerably lower than the speed of the drive shaft.

A unique feature of this gearing is that the load upon each gear 30 is distributed between two gears 25 so that the bearing load approaches the condition of a floating gear, similar to the reverse speed gears 25. This desirable result is obtained by reason of each gear 30 meshing with both adjacent reverse speed gears 25. This arrangement is believed new in compound epicyclic gearing and prevents bearing wear from altering the pitch line engagement of the gear teeth.

The direct drive in our transmission is effected by clutching together several of the relatively rotating members of the transmission. The internal gear 26, the planet carrier 22, the web 20 and the disc 17 are clutched together to effect the direct drive. For the reason that in neutral the gear 19 tends to rotate in a reverse direction at about ¾ engine speed, a very effective clutching action is obtained between the disc 17 and web 20. In order to effect this clutching action a disc of friction material 64 is interposed between the disc 17 and the web 20, a second similar disc 31 is interposed between the web 20 and the planet carrier 22 and a third disc 32 is interposed between the planet carrier and the piston 27. The sleeve 28, being permitted to move longitudinally upon the sleeve 13, axial movement of the piston head 27 will frictionally lock the several members together. In order to effect such axial movement we have provided a relatively short cylinder 33 of large diameter in which the piston 27 is reciprocally mounted. A cylinder head 34 is formed integrally with the cylinder 33 and is provided with a sleeve 35 which rotatably supports the cylinder. This sleeve is permitted axial movement upon the sleeve 28. It will be noted from Figure 2 that a collar 36 is secured to the outer end of the sleeve 28 which extends back over the sleeve 35. A plurality of arms 37 are pivotally mounted upon the collar which arms extend from the collar radially to the periphery of the cylinder head 34. A fulcrum cone 38 is fixed to the sleeve 13 and is positioned to bear against the intermediate portions of each arm 37.

When fluid under pressure is forced between the piston 27 and the cylinder head 34, the cylinder is forced outwardly which tends to pivot the arms 37 around the fulcrum cone 38. This movement reacts against the collar 36 and inasmuch as this collar is fixedly secured to the piston 27, the piston is thereby forced against the friction disc 32. The several members are thereby frictionally clamped together so as to rotate as a unit in direct drive. An important feature in this connection is that mechanical amplification of the axial movement due to the fluid pressure is obtained through the arms 37. A three to one increase in pressure is obtained by this construction over what would be obtained if the cylinder head 34 was fixed to the housing so that the fluid pressure would directly act only upon the piston 27. A plurality of compression springs 65 are interposed between the collar 36 and the cylinder head 34 which springs resiliently urge the piston and cylinder into their neutral positions.

A conical shield 66 is secured to the periphery of the internal gear 26 which shield encloses the arms 37 and the cone 38. The purpose of the shield 66 is to form an annular reservoir which encloses the cylinder head 34 and thus counteracts the tendency of the piston to engage, due solely to the centrifugal pressure applied to the oil within the cylinder. When the device is in direct drive, a considerable amount of oil is forced within the cylinder 33. Even though the oil pressure is now released, a centrifugal pressure continues in the oil which prevents the springs 65 from pushing the oil towards the center of the drive shaft 11. However, with the shield 66 installed a quantity of oil collects in this shield, which upon rotation of the device sets up a centrifugal pressure which reacts upon the outside of the cylinder head 34, thus counterbalancing the engaging force due to the centrifugal pressure within the cylinder.

If for any reason it is undesirable to use the shield 66, the aforementioned centrifugal pressure may be counteracted by adding counterweights to the arms 37. These counterweights should be added to the arms at a point to the right of the arm pivots, so that an increase in the speed of rotation of the device will cause the arms to exert an increased pressure against the cylinder head.

Referring to Figure 1, it will be noted that the housing 10 is provided with two pair of diametrically opposed cylinder bores 39, one pair being aligned with the drum 21 while the second pair is aligned with the reverse drum 23. These bores are circumferentially offset from each other so that the axial space between the two sets of drums may be minimized. Each of the bores 39 is closed by means of a cap 40, these caps each having a pin 41 projecting radially inwardly therefrom, which pins reciprocally support spherical shaped pistons 42. These pistons closely fit the bores 39. Two pair of brake bands 43 are anchored at diametrically opposite points in the housing, while each pair of bands is aligned with one of the drums 21 and 23. The free end of each band is secured to one arm of a bell crank lever 44 which is pivotally mounted in the housing on pins 45 with the free end of each lever in position to abut the center of the adjacent piston 42. Upon oil under pressure being fed to the space between any piston 42 and its cap 40, the piston is forced inwardly which pivots the adjacent lever 44 around its pin 45 to thereby draw the adjacent brake band 43 into contact with the enclosed brake drum. The two bands which are associated with each drum act simultaneously. The anchored ends of each pair of bands being diametrically opposed, it follows that all bending stresses upon the shaft 11, due to the tendency of the bands to rotate the shaft around its particular anchor, are neutralized. Thus, when either pair of brake bands is engaged to hold its drum from rotation, no bending stresses are set up in the gears or in the shaft. The lack of this feature is a frequent cause of trouble in transmissions as bending stresses ordinarily increase the bearing load of gears materially over that resulting from the tooth pressure on the gears.

In order to simultaneously actuate the bands associated with each brake drum and to effect the direct drive, we have provided a rotary valve unit which is adapted to be bolted to one side of the transmission housing 10. This unit comprises a body member 46 having a cylindrical bore extending therethrough in which bore a plunger 47 is rotatably mounted. The body 46 is provided with a port 48 which is adapted to be connected to an oil pump 57 which is driven by the engine of the vehicle. The port 48 is aligned with an annular groove in the plunger 49 so that oil under pressure is conducted to this groove at every position of the plunger.

The valve body 46 is provided with a pair of diametrically opposed ports 50 which are aligned with the reverse speed drum while a similar pair of ports 51 are aligned with the low speed effecting drum. Still another pair of diametrically opposed ports 52 are provided in the body 46 between the low speed ports and the end of the valve. Suitable lands 53 are provided upon the plunger 49 which successively form closures for the several pairs of ports when the plunger is rotated. Triangular shaped openings extend through each land 53 to a bore 54 in the center of the plunger 49, the openings being of triangular cross section in order that the engagement of the plunger may be more gradual. The annular groove in the plunger is connected to the bore 54 by a suitable drilled opening.

It will be noted that, when the plunger is rotated to any of its three positions the openings in one pair of lands are aligned with a pair of ports thereby allowing oil under pressure to flow from the plunger through these ports to one pair of cylinder bores 39 or to the cylinder 33. For example, when the valve is moved to the reverse speed position and the engine is being operated, the bands associated with the reverse speed drum immediately lock into engagement to thereby hold the planet carrier 22 from rotation and thus effect the reverse speed. When the plunger is rotated through 45 degrees none of the plunger lands obstruct the ports 50, 51 or 52 so that both pairs of bands and also the direct drive are out of engagement to thereby allow the transmission to remain in neutral position. When the plunger is moved still further through 45 degrees, the low speed ports 51 become aligned with the openings in the adjacent lands 53 which thereby conduct oil under pressure to the low speed brake, thereby effecting the low speed. The still further movement of the plunger through 45 degrees causes the lands associated with the ports 52 to conduct oil under pressure to the direct drive piston. Suitable notches 55 are provided in the periphery of the plunger 49 which coact with adjacent spring urged detents, not shown in the drawings, to accurately align the plunger in each of the aforementioned positions. It will be noted from Figure 1 that when the plunger is not conducting oil to any one of the pistons, such pistons become open to the atmosphere within the transmission housing so that suitable springs 56, which coact with each band, tend to return the pistons to their outward or inoperative positions.

In order that the device may be adequately lubricated when operating in reverse or low speeds or when the gearing is in neutral, we have provided what is believed to be a unique lubricating arrangement. As has been mentioned, the outlet of the pump 57 is connected to the port 48 of the control valve. The conduit which extends from the ports 52 to actuate the direct drive piston comprises a drilled opening in the housing 10; however, this opening is shown diagrammatically in Figure 2 as a conduit 58. It will be noted that the conduit 58 extends to an annular chamber 59 formed around the outer bearing of the shaft 11 to thereby conduct oil under pressure to this chamber when the control valve has been actuated to the direct drive position. The shaft 11 is provided with an axial bore 60 extending practically the full length thereof with the portion of the shaft adjacent to the chamber 59 having a radial opening therethrough connecting the bore with the chamber to allow oil under pressure to be forced into the shaft. A second radial opening 61 is provided in the shaft 11 aligned with the outer end of the sleeve 13 and suitable annular chambers with corresponding openings are provided in this sleeve and in the sleeve 28 whereby oil under pressure in the opening 61 may freely flow to the space between the piston 27 and cylinder head 34.

The aforementioned means for conducting oil to the piston 27 is well known; however, if used alone it would have the disadvantage that when the transmission was being operated in neutral, reverse or low speeds no oil would flow through the axial bore 60 to lubricate the gearing. It is only when the transmission is in direct drive that the oil flows through the conduit 58 to the bore 60. Consequently, the gearing and bearings in the transmission would need be provided with other means for lubrication. In order to provide such lubricating means without resorting to a second opening in the shaft 11, we have connected the outlet port of the pump 57 directly with the inner end of the opening 60 by means of a conduit 62. Interposed in the conduit 62, we have provided an orifice 63 having an opening therein of one thirty-second of an inch in diameter.

When the plunger is moved to the high speed or direct drive position, oil is conducted by means of the conduits 58 and 62 to the axial bore 60 thereby forcing the piston 27 to effect the direct drive. In this position neither end of the bore 60 is open so that the full output of the pump actuates the piston 27. If it is now desired to shift the transmission to any other speed, the plunger is rotated thereby opening the conduit 58 to the chamber within the transmission so that the pressure in the bore 60 drops to practically zero and allows the direct drive to disengage. At this time oil flows through the orifice 63 under high pressure and then through the conduit 62 into the axial bore 60. The pressure within the bore 60 is sufficiently low, due to the conduit 58 being open, that the piston 27 is not operated. However, sufficient oil flows through the bore 60 to lubricate the various bearings and gears. An advantage of this construction is that no check valve or other comparatively fragile fittings are required and still a single bore through the drive shaft serves both as a direct drive actuating conduit and as a lubricating conduit.

Among the many advantages arising from the use of our improved device it may be well to mention that we have provided a transmission employing what is believed to be a novel type of planetary gearing wherein the rotating speeds of every gear are less than engine speed in both neutral and low speeds. This is an important feature as it makes the transmission exceptionally quiet and consequently prolongs its life.

Still a further advantage results from this construction in that the planet carrier, drive shaft, and driven gear are directly engaged together to effect a direct drive without the provision of the conventional multiple plate clutch heretofore employed for this purpose.

A further advantage resulting from the use of our improved construction is that a quickly responsive action occurs when the valve is actuated to any of its positions due to the minimum of linkage between the pistons and the operating ends of the brake bands.

Some changes may be made in the arrangement, construction and combination of the various parts of our improved device without departing from the spirit of our invention, and it is our intention to cover by our claims, such changes as may reasonably be included within the scope thereof.

We claim as our invention:

1. A transmission comprising, a driving shaft, a driven sleeve, a plurality of relatively rotatable elements mounted upon said shaft at least one of said elements being adapted to be held from rotation to effect a reduced speed ratio between said shaft and sleeve, a cylinder and piston mounted upon said shaft in axial alignment therewith, a mechanical amplifying means extending between said piston and cylinder and said elements whereby an axial outward movement of said piston in the cylinder will axially shift said elements into frictional engagement at an amplified pressure to thus effect a direct drive, and means for conducting fluid under pressure to the space between said piston and cylinder.

2. A transmission comprising, a driving shaft having a driving sun gear fixed thereon, a driven member mounted in axial alignment with said shaft, said driven member having an internal gear fixed thereto, reverse speed planet gears forming a driving connection between said internal gear and said driving gear, a planet carrier rotatably supporting said planet gears, which carrier when held from rotation causing said internal gear to rotate in a reverse direction at a reduced speed, said carrier rotating in a forward direction at a reduced speed when free, a low speed effecting sun gear rotatably mounted upon said shaft, low speed planet gears rotatably mounted in said planet carrier in mesh with said low speed sun gears, and a gear connection between said low speed gears and said reverse gears, such that upon holding said low speed sun gear from rotation said planet carrier will be driven in a forward direction at a speed greater than its free speed to thus carry said internal gear forwardly at a reduced speed.

3. A transmission comprising, a driving shaft having a driven sun gear fixed thereon, a driven member rotatably mounted in axial alignment with said shaft, said driven member having an internal gear fixed thereto, reverse speed planet gears forming a driving connection between said internal gear and said driving gear, a planet carrier rotatably supporting said planet gears, which carrier when held from rotation causes said internal gear and driven member to rotate in a reverse direction at a reduced speed, said carrier rotating in a forward direction at a reduced speed when free, low speed effecting sun gear rotatably mounted upon said shaft, said low speed sun gear having a smaller pitch diameter than said driving sun gear, low speed cluster gears rotatably mounted in said planet carrier in mesh with both said low speed sun gear and said reverse speed planet gears, whereby upon holding said low speed sun gear from rotation said planet carrier will be driven in a forward direction at a speed greater than its free speed to thus carry said internal gear and driven member forwardly at a reduced speed.

4. A transmission comprising, a driving shaft having a driving sun gear fixed thereon, a driven sleeve rotatably mounted upon said shaft, said sleeve having an internal gear fixed thereto, reverse speed planet gears equally spaced around said sun gear forming a driving connection between said internal gear and said driving gear, a planet carrier rotatably supporting said planet gears, which carrier when held from rotation causes said internal gear to rotate in a reverse direction at a reduced speed, said carrier rotating in a forward direction at a reduced speed when free, a low speed effecting sun gear rotatably mounted upon said shaft, low speed cluster gears rotatably mounted in said planet carrier in position spaced between said reverse planet gears, one gear of each of said cluster gears being in mesh with said low speed sun gear and the other gear of said cluster gears being in mesh with the reverse planet gears on each side thereof, said gears being so proportioned that upon holding said low speed sun gear from rotation said planet carrier will be driven in a forward direction at a speed greater than its free speed to thus carry said internal gear forwardly at a reduced speed.

5. A transmission comprising, a driving shaft having a driving sun gear fixed thereon, a driven member rotatably mounted in axial alignment with said shaft, which driven member has an internal gear fixed thereto, reverse speed planet gears forming a driving connection between said internal gear and said driving sun gear, a planet carrier rotatably supporting said planet gears, which carrier when held from rotation causes said internal gear to rotate in a reverse direction at a reduced speed, said carrier rotating in a forward direction at a reduced speed when free, a low speed effecting sun gear rotatably mounted upon said shaft, cluster gears rotatably mounted in said planet carrier, one gear of each cluster being in mesh with said low speed sun gear and the other gear of each cluster being in mesh with two adjacent reverse speed planet gears so that when said low speed sun gear is held from rotation said planet carrier will be driven in a forward direction at a speed greater than its free speed, to thus drive said internal gear forwardly at a reduced speed, a disc extending radially from said low speed effecting sun gear, a second disc fixed to said driving shaft which extends radially therefrom, and means for clamping said internal gear and planet carrier and said discs together to effect a direct drive.

6. A transmission, as claimed in claim 5, wherein the means for clamping said internal gear and planet carrier to said discs comprise a fluid operated piston and cylinder, said piston being fixed to said internal gear for movement therewith.

7. A transmission comprising, a drive shaft, a member rotatably mounted upon said shaft, a cylinder mounted upon said shaft, said shaft having an axial opening extending therealong with radial openings communicating with both said cylinder and the bearing of said rotating member, a fluid pressure pump, a conduit extending from said pump to one end of said axial opening, a control valve disposed in said conduit, whereby said opening may be connected to said pump or opened to the atmosphere, a second conduit extending from said pump to the other end of said axial opening, and a restricting orifice disposed in said second mentioned conduit so that when said valve is in one position fluid under pressure will be supplied to said axial opening and when said valve is in its other position fluid will flow through said axial opening under little or no pressure.

8. A transmission comprising, a drive shaft, a gear rotatably mounted upon said shaft, a clutch operating cylinder rotatably mounted upon said shaft, said shaft having an axial opening therein with radial openings communicating with both said cylinder and the bearing of said gear, a fluid pressure pump, a conduit extending from said pump to one end of said axial opening, a control valve disposed in said conduit whereby said opening may be connected to said pump or opened to the atmosphere, a second conduit extending from said pump to the opposite end of said axial opening, and a restricting orifice disposed in said second mentioned conduit.

HENRY FORD.
ALBERT O. ROBERTS.
HOWARD W. SIMPSON.